(12) United States Patent
Choi et al.

(10) Patent No.: US 7,010,487 B1
(45) Date of Patent: Mar. 7, 2006

(54) METHOD FOR COMPARING SIMILARITY BETWEEN PHONETIC TRANSCRIPTIONS OF FOREIGN WORD

(75) Inventors: Key-Sun Choi, Taejon (KR); Byung-Ju Kang, Taejon (KR); Jae Sung Lee, Taejon (KR)

(73) Assignee: Korea Advanced Institute of Science and Technology, (KR)

( * ) Notice: Subject to any disclaimer, the term of this patent is extended or adjusted under 35 U.S.C. 154(b) by 0 days.

(21) Appl. No.: 09/578,371

(22) Filed: May 25, 2000

(30) Foreign Application Priority Data

Sep. 1, 1999 (KR) .................................. 99-36905

(51) Int. Cl.
*G10L 15/00* (2006.01)
(52) U.S. Cl. ..................... 704/257; 704/275
(58) Field of Classification Search ............. 704/257, 704/275
See application file for complete search history.

(56) References Cited

U.S. PATENT DOCUMENTS

| | | | | |
|---|---|---|---|---|
| 6,026,398 A | * | 2/2000 | Brown et al. | 707/5 |
| 6,178,397 B1 | * | 1/2001 | Fredenburg | 704/1 |
| 6,377,927 B1 | * | 4/2002 | Loghmani et al. | 704/275 |

OTHER PUBLICATIONS

"Retrieval Effectiveness of Proper Name Search Methods", By Ulrich Pfeifer et al., dated May 6, 1996.
"Phonix: The Algorithm", By T. N. Gadd, vol. 24, No. 4, Oct. 1990, pp. 363-366.
"Phonetic String Matching: Lessons From Information Retrieval", By Justin Zobel et al. no date.

* cited by examiner

Primary Examiner—Daniel Abebe
(74) Attorney, Agent, or Firm—Bachman & LaPointe, P.C.

(57) ABSTRACT

The method described herein provides for comparing a similarity between various phonetic transcriptions of a specific foreign word on the basis of an English pronunciation similarity comparison algorithm.

4 Claims, 1 Drawing Sheet

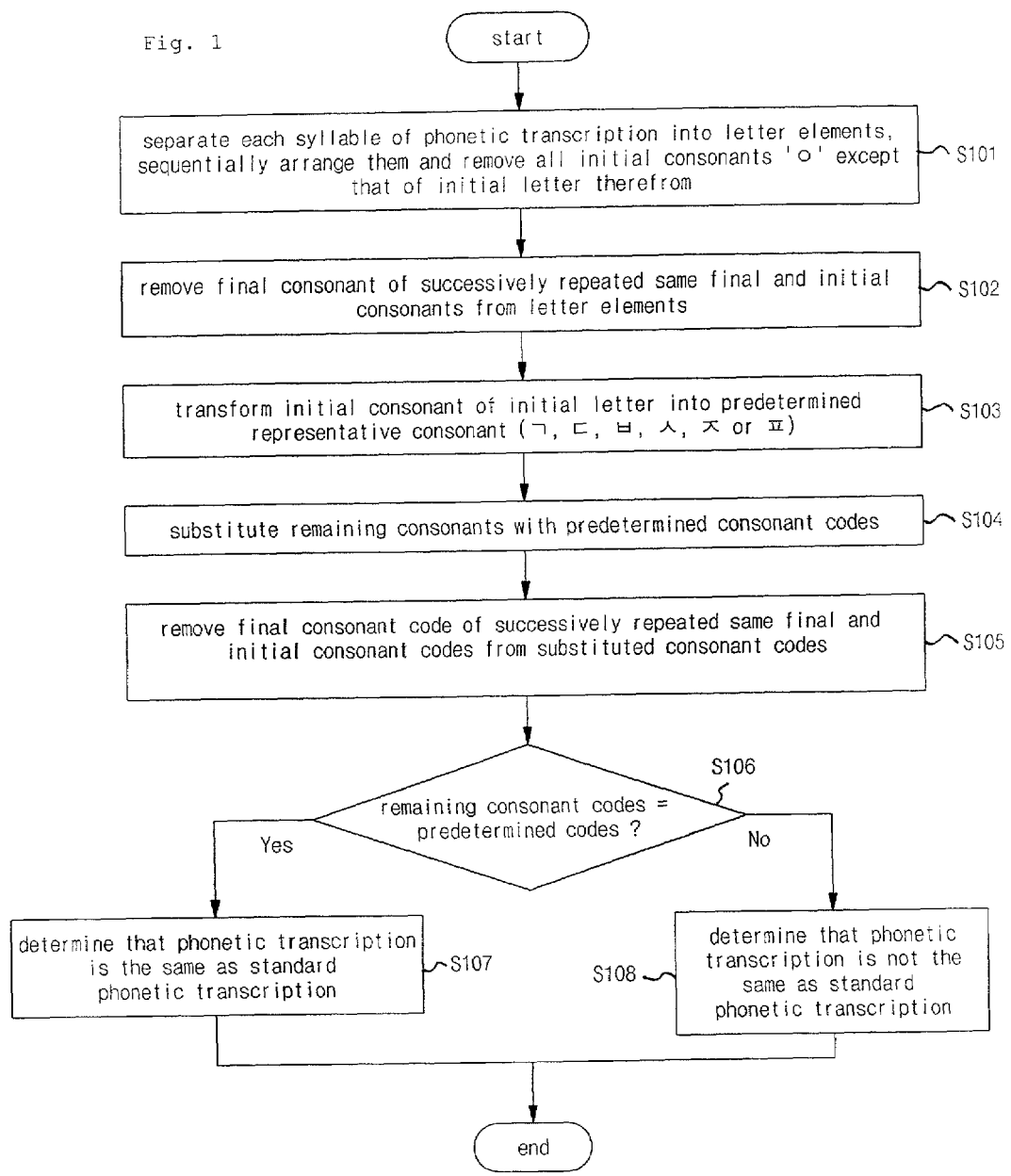

METHOD FOR COMPARING SIMILARITY BETWEEN PHONETIC TRANSCRIPTIONS OF FOREIGN WORD

BACKGROUND OF THE INVENTION

1. Field of the Invention

The present invention relates in general to a method for comparing/discriminating a similarity between phonetic transcriptions of a foreign word, and more particularly to a method for comparing a similarity between various phonetic transcriptions of a specific foreign word on the basis of an English pronunciation similarity comparison algorithm, which is generally used in the English-speaking world.

2. Description of the Prior Art

With various exchanges with foreign countries recently increasing, phonetic transcriptions of many foreign words have been used in Korean documents. Most of the phonetic transcriptions are concerned with proper nouns or technical terms originally expressed in English. In particular, it is common that scientific and technological fields have no choice but to employ the phonetic transcriptions, because there is no Korean translation for such English technical terms.

However, there is a severe individual difference in the phonetic transcriptions of the foreign words, thus making it difficult to retrieve Korean document texts on the basis of such phonetic transcriptions. For example, three Korean phonetic transcriptions such as "디지틸", "디지탈" and "디지틀" may be used together with respect to an English technical term "digital". Among these Korean phonetic transcriptions, the "디지털" has been proposed as a standard, but the "디지탈" has actually been more frequently used and, occasionally, the "디지틀" has been used according to private views.

Because various Korean phonetic transcriptions may be used together with respect to the same foreign word as mentioned above, documents with such phonetic transcriptions may not often be retrieved unless a diversity of the phonetic transcriptions is considered in the document retrieval. In order to overcome such a problem, there has been proposed a method for grouping various Korean phonetic transcriptions expressing the same foreign word into an equivalence class, indexing the grouped equivalence class and automatically expanding it upon word query [see: Jeong, K. S., Kwon, Y. H., and Myaeng, S. H., "The Effect of a Proper Handling of Foreign and English Words in Retrieving Korean Text", In Proceedings of the 2nd International Workshop on Information Retrieval with Asian Languages (IRAL' 97), 1997].

The creation of such a phonetic transcription equivalence class requires a method for determining whether two given phonetic transcriptions are derived from the same foreign word, namely, for comparing a similarity between the two phonetic transcriptions.

The above phonetic transcription similarity comparison method is also basically necessary to an approximate search for a phonetic transcription (foreign words) database. For example, the similarity comparison method may be usefully utilized for the search for either firm names or trademarks of words of foreign origin.

However, no method has been developed until now for similarity comparison between Korean phonetic transcriptions, because Korean words are spelled using the same phonetic symbols as their pronunciations and thus in clear connection with the pronunciations. For this reason, it is very inconvenient for the user to retrieve and manage data on the basis of phonetic transcriptions of foreign words.

SUMMARY OF THE INVENTION

Therefore, the present invention has been made in view of the above problem, and it is an object of the present invention to provide a method for comparing a similarity between various phonetic transcriptions of a specific foreign word on the basis of an English pronunciation similarity comparison algorithm, which is generally used in the English-speaking world.

In accordance with the present invention, the above and other objects can be accomplished by a provision of a method for comparing a similarity between phonetic transcriptions of a specific foreign word, comprising the first step of separating each syllable of each of the phonetic transcriptions into consonants and vowels, sequentially arranging the resultant letter elements and removing all initial consonants 'o' except that of an initial letter from the arranged letter elements; the second step of removing an earlier one of successively repeated same consonants from the arranged letter elements; the third step of transforming an initial consonant of the initial letter into a predetermined representative consonant; the fourth step of substituting the remaining consonants with predetermined consonant codes; the fifth step of removing a desired one of successively repeated same codes from the substituted consonant codes, the successively repeated same codes being sequentially final and initial consonant codes, the removed code being the final consonant code; and the sixth step of comparing the remaining consonant codes with predetermined codes based on the standard rules of foreign word transcription and determining that each of the phonetic transcriptions is the same as a standard phonetic transcription of the specific foreign word if the remaining consonant codes are equal to the predetermined codes.

BRIEF DESCRIPTION OF THE DRAWINGS

The above and other objects, features and advantages of the present invention will be more clearly understood from the following detailed description taken in conjunction with the accompanying drawings, in which:

FIG. 1 is a flowchart illustrating a method for comparing a similarity between phonetic transcriptions of a foreign word in accordance with the present invention.

DETAILED DESCRIPTION OF THE PREFERRED EMBODIMENTS

First, a brief description will be given of the technical concept of the present invention.

A method for similarity comparison between phonetic transcriptions of a foreign word in accordance with the present invention can borrow a basic methodology from an English Soundex algorithm.

Such a Soundex algorithm (see: Hall, P. and Dowling, G., "Approximate string matching", Computing Surveys, Vol. 12, No. 4, pp. 381–402, 1980) is an English pronunciation similarity comparison algorithm, which is generally used in the English-speaking world. The Soundex algorithm is mainly used to effectively perform an approximate search for a desired name from a name (names of persons, places, etc.) database on the basis of its pronunciation when it is not accurately known in spelling.

The above Soundex algorithm is adapted to compare a phonetic similarity between English words in such a manner that it removes vowels from the English words, assigns the same code to every group of analogously pronounced consonants among the remaining consonants and determines that the words are similar in pronunciation if their Soundex code strings are the same.

A detailed method for producing a Soundex code string is as follows:

(1) removes all vowels from each word;
(2) removes 'H', 'W' and 'Y' and all successively repeated same ones from consonants; and
(3) substitutes the next three letters except the initial one with Soundex codes in the below table 1.

TABLE 1

| CONSONANTS | CODES |
| --- | --- |
| B F P V | 1 |
| C G J K Q S X Z | 2 |
| D T | 3 |
| L | 4 |
| M N | 5 |
| R | 6 |

If Soundex code strings (containing codes regarding the maximum four letters) of two words produced on the basis of the above table 1 are the same, then those words are determined to have similar pronunciations.

It should be noted that the above-mentioned typical Soundex algorithm cannot be applied directly to Korean words due to differences between English phonological structure and rule and Korean phonological structure and rule. In accordance with the present invention, the existing Soundex algorithm is modified and applied in consideration of phonological characteristics of the Korean language to be adequate for, the actual circumstances of the Korean language.

The similarity comparison method of the present invention is mainly adapted to compare a similarity between various Korean phonetic transcriptions derived from the same English word. In this regard, the present phonetic transcription similarity comparison method basically compares a pronunciation similarity between consonants without considering vowels. In brief, the present phonetic transcription similarity comparison method assigns the same code to every group of consonants confused in pronunciation and determines that given phonetic transcriptions are derived from the same English word if their code strings are the same.

Now, a detailed description will be given of the phonetic transcription similarity comparison method of the present invention with reference to a flowchart of FIG. 1.

First, at step S101, each syllable of a given Korean phonetic transcription of a specific foreign word is separated into consonants and vowels, or letter elements, which are then arranged in order. Subsequently, all initial consonants 'o' except that of the initial letter are removed from the arranged letter elements.

In the case where the same consonants are successively repeated among the arranged letter elements after the initial consonants 'o' are removed at the above step S101, the earlier one (i.e., final consonant) of them (i.e., final and initial consonants) is removed at step S102 and an initial consonant of the initial letter is then transformed into a predetermined representative consonant (see the table 3) at step S103.

After the initial consonant of the initial letter is transformed into the predetermined representative consonant at the above step S103, the remaining consonants are substituted with predetermined consonant codes (see the table 2) at step S104.

TABLE 2

| CONSONANTS | CODES |
| --- | --- |
| ㄱ ㄱ* ㄲ ㅋ | 1 |
| ㄴ ㄴ* ㅇㅇ* | 2 |
| ㄷ ㄸ ㅌ ㅅ* ㅊ | 3 |
| ㄹ ㄹ* | 4 |
| ㅁ ㅁ* | 5 |
| ㅂ ㅂ* ㅃ ㅍ ㅎ | 6 |
| ㅅ ㅆ ㅈ ㅉ | 7 |

TABLE 3

| CONSONANTS | REPRESENTATIVE CONSONANTS |
| --- | --- |
| ㄲ | ㄱ |
| ㄸ | ㄷ |
| ㅃ | ㅂ |
| ㅆ | ㅅ |
| ㅉ | ㅈ |
| ㅎ | ㅍ |

The above table 2 shows all groups of consonants to which the present phonetic transcription similarity comparison method is applied and code values assigned respectively to the consonant groups, and the above table 3 shows representative consonants into which the initial consonant of the initial letter can be transformed.

In the above table 2, consonants marked with '*' on the right thereof signify final consonants. A Kodex algorithm permits only seven final consonants 'ㄱ', 'ㄴ', 'ㄹ', 'ㅁ', 'ㅂ', 'ㅅ' and 'o' on the basis of the standard rules of foreign word transcription [see: Notification No. 1995-8 of the Ministry of Culture and Sports in Korea, "The Rules of Foreign Word Transcription", Mar. 16, 1995]. Further, the Kodex algorithm employs nineteen consonants defined in the standard rules of Korean pronunciation [see: Notification No. 88-2 of the Ministry of Culture and Education in Korea, "The Standard Pronunciation Rules", Jan. 19, 1998]. Hence, the total twenty-six consonants shown in the below table 4 are used in the present invention.

TABLE 4

ㄱ ㄱ* ㄲ ㄴ ㄴ* ㄷ ㄸ ㄹ ㄹ* ㅁ ㅁ*
ㅂ ㅂ* ㅃ ㅅ ㅅ* ㅆ ㅇㅇ* ㅈ ㅉ ㅊ
ㅋ ㅌ ㅍ ㅎ

After the consonants are substituted with the predetermined consonant codes at the above step S104, a desired one (i.e., final consonant code) of successively repeated same codes (i.e., final and initial consonant codes) is removed from the substituted consonant codes at step S105 and the remaining consonant codes are then compared with predetermined codes based on the standard rules of foreign word transcription at step S106.

In the case where it is determined at the above step S106 that the remaining consonant codes are equal to the predetermined codes, the operation proceeds to step S107 to determine that the given Korean phonetic transcription is the same as a standard phonetic transcription of the specific foreign word. However, if it is determined at the above step S106 that the remaining consonant codes are not equal to the predetermined codes, then the operation proceeds to step S108 to determine that the given Korean phonetic transcription is not the same as the standard phonetic transcription of the specific foreign word.

The following tables 5 to 7 show exemplary embodiments of the method for comparing a similarity between phonetic transcriptions of a foreign word in accordance with the present invention.

TABLE 5

| PACKET | SEPARATION/ARRANGEMENT | 1st STEP | 2nd STEP | 3rd STEP | 4th STEP | 5th STEP | KODEX |
|---|---|---|---|---|---|---|---|
| 패킷 | ㅍㅐㅋㅣㅅ* | | | | ㅍ13 | ㅍ13 | ㅍ13 |
| 패키트 | ㅍㅐㅋㅣㅌ— | | | | ㅍ13 | ㅍ13 | ㅍ13 |
| 팩킷 | ㅍㅐㄱ*ㅋㅣㅅ* | | | | ㅍ113 | ㅍ13 | ㅍ13 |

In the above table 5, "패킷", "팩킷" and "패키트" are Korean phonetic transcriptions expressing an English word "packet". In the present phonetic transcription similarity comparison method, those phonetic transcriptions are converted into the same code string "ㅍ13" and thus considered to be similar ones derived from the same English word.

TABLE 6

| WINDOWS | SEPARATION/ARRANGEMENT | 1st STEP | 2nd STEP | 3rd STEP | 4th STEP | 5th STEP | KODEX |
|---|---|---|---|---|---|---|---|
| 윈도우 | ㅇTㅣㄴ*ㄷ<br>ㅗㅇTㅈ— | ㅇTㅣㄴㄷ<br>ㅗTㅈ— | | | ㅇ237 | | ㅇ237 |
| 윈도우스 | ㅇTㅣㄴㄷ<br>ㅗㅇTㅅ— | ㅇTㅣㄴㄷ<br>ㅗTㅅ— | | | ㅇ237 | | ㅇ237 |
| 윈도즈 | ㅇTㅣㄴㄷ<br>ㅗㅈ— | ㅇTㅣㄴㄷ<br>ㅗㅈ— | | | ㅇ237 | | ㅇ237 |

TABLE 7

| SOUND | SEPARATION/ARRANGEMENT | 1st STEP | 2nd STEP | 3rd STEP | 4th STEP | 5th STEP | KODEX |
|---|---|---|---|---|---|---|---|
| 싸운드 | ㅆㅏㅇT<br>ㄴ*ㄷ— | ㅆㅏT<br>ㄴㄷ— | ㅅTㄴ*<br>ㄷ— | ㅅ23 | | ㅅ23 |
| 사운드 | ㅅㅏㅇT<br>ㄴ*ㄷ— | ㅅㅏT<br>ㄴ*ㄷ— | ㅅTㄴ*<br>ㄷ— | ㅅ23 | | ㅅ23 |

As apparent from the above description, according to the present invention, the foreign word phonetic transcription similarity comparison method is capable of rapidly retrieving various data and indexes with mixed phonetic transcriptions of foreign words without confusion. Therefore, the present invention provides a similar transcription retrieval standard adequate to the Korean language.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for comparing a similarity between phonetic transcriptions of a specific foreign word, comprising the steps of:
   a) separating each syllable of each of said phonetic transcriptions into consonants and vowels, sequentially arranging the resultant letter elements and removing all initial consonants 'ㅇ' except that of an initial letter from the arranged letter elements;
   b) removing an earlier one of successively repeated same consonants from the arranged letter elements;
   c) transforming an initial consonant of said initial letter into a predetermined representative consonant;
   d) substituting the remaining consonants with predetermined consonant codes;
   e) removing a desired one of successively repeated same codes from the substituted consonant codes, said successively repeated same codes being sequentially final and initial consonant codes, said removed code being said final consonant code; and
   f) comparing the remaining consonant codes with predetermined codes based on the standard rules of foreign word transcription and determining that each of said phonetic transcriptions is the same as a standard phonetic transcription of said specific foreign word if the remaining consonant codes are equal to said predetermined codes.

2. The method as set forth in claim 1, wherein said predetermined representative consonant transformed at said step c) is "ㄱ", "ㄷ", "ㅂ", "ㅅ", "ㅈ" or "ㅍ".

3. The method as set forth in claim 1, wherein said step d) includes the step of assigning a consonant code "1" to the remaining consonants "ㄱ", "ㄱ*", "ㄲ" and "ㅋ", consonant code "2" to the remaining consonants "ㄴ", "ㄴ*", "ㅇ" and "ㅇ*", a consonant code "3" to the remaining consonants "ㄷ", "ㄸ", "ㅌ", "ㅅ*" and "ㅊ", a consonant code "4" to the remaining consonants "ㄹ" and "ㄹ*", a consonant code "5" to the remaining consonants "ㅁ" and "ㅁ*", a consonant code "6" to the remaining consonants "ㅂ", "ㅂ*", "ㅃ", "ㅍ" and "ㅎ", and a consonant code "7" to the remaining consonants "ㅅ", "ㅆ*", "ㅈ" and "ㅉ", respectively.

4. The method as set forth in claim 3, further comprising a mark '*' indicating that an associated consonant is a final consonant.

* * * * *